Aug. 17, 1937.  B. GROB  2,090,195
OPEN END BAND SAW MACHINE
Filed May 4, 1935  2 Sheets-Sheet 1
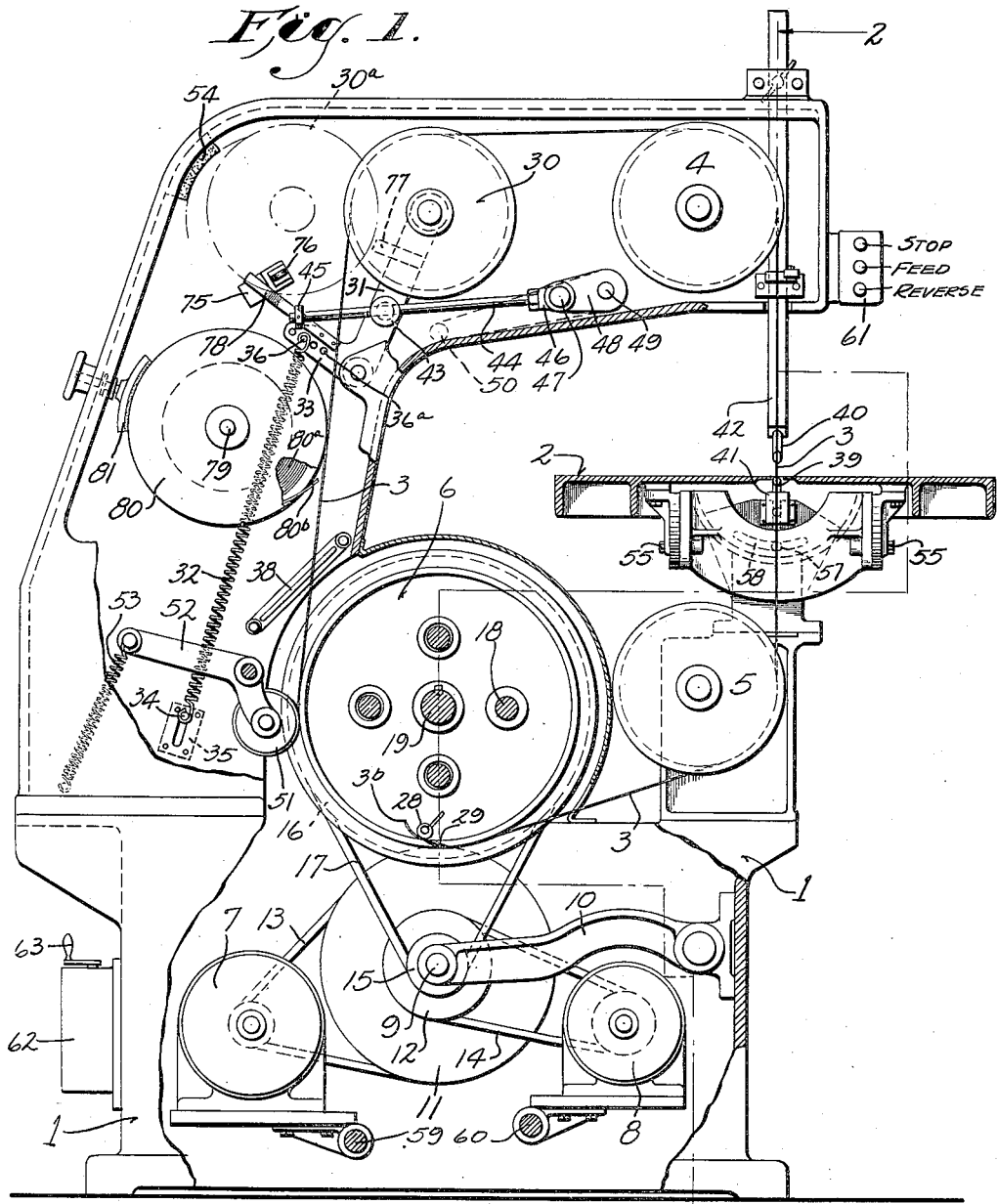
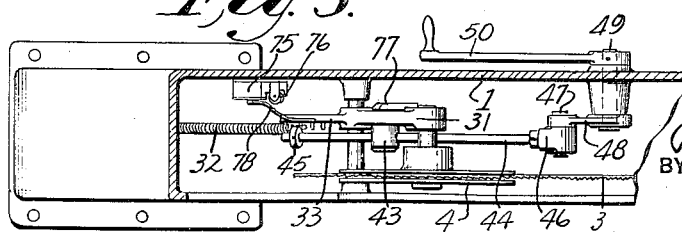
INVENTOR
Benjamin Grob
BY
Fred G. Parsons
ATTORNEY

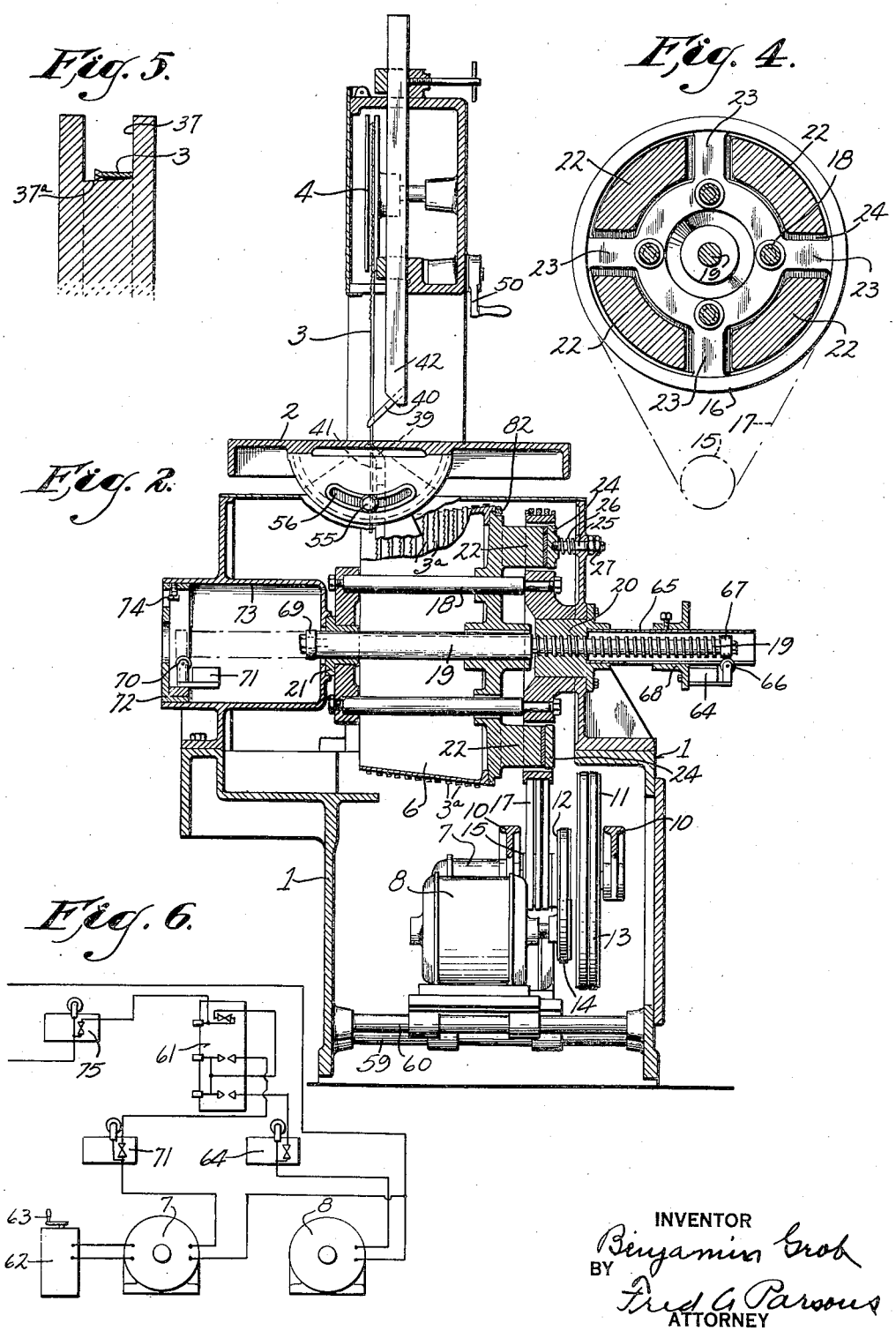

Patented Aug. 17, 1937

2,090,195

UNITED STATES PATENT OFFICE 2,090,195

OPEN END BAND SAW MACHINE

Benjamin Grob, West Allis, Wis., assignor to Grob Brothers, West Allis, Wis., a partnership composed of Benjamin Grob and Theodore Grob Application May 4, 1935, Serial No. 19,785

19 Claims. (Cl. 29—68)

This invention relates to band sawing machines, and more particularly to an improved machine adapted to be used for sawing out internal portions of work pieces such as die blocks, stripper plates, etc., where the saw in order to be operative must be threaded through the work piece.

A purpose is to provide an improved transmission and control mechanism for an open end band saw machine of the type shown in a copending application Serial No. 2,529, filed January 19, 1935, providing for forward or sawing movements at a variety of rates of saw movement to suit different work materials, and for reverse movements for bringing the saw back to an initial starting position at a relatively fast or quick traverse rate.

A further purpose is to provide a band saw machine having improved control means and interconnection and relationship thereof, insuring safety for the operator of the machine, and preventing operation under conditions which would damage the machine or saw.

Another purpose is to provide a band saw machine having an improved arrangement for initially loading and adjusting the saw into the machine.

Another purpose is to provide improved combination of an open end band saw with a machine adapted for use of such a saw, in which the saw is of improved form, particularly adapted for this type of machine.

Another purpose is generally to simplify and improve the construction and operation of open end band saw machines, and still other purposes will be apparent from this specification.

The invention consists of the structure here shown, described, and claimed, together with such modifications of the structure shown and described as may be equivalent to the structure claimed.

In the drawings, like parts are designated by the same reference characters throughout the several views.

Figure 1 shows a band saw machine incorporating the invention, in an elevation viewed from the front or operator's position, and partly in section.

Figure 2 shows a sectional elevation of the same machine along a line approximately corresponding to the line 2—2 of Figure 1.

Figure 3 is a partial section of the machine, showing a top view of certain of the mechanism shown in the upper left hand corner of Figure 1.

Figure 4 shows some of the details of a brake device shown in Figure 2.

Figure 5 shows a partial section through one of the guide pulleys of the machine.

Figure 6 shows a diagram of some of the control mechanism, more particularly the connection of certain electrical control means.

The machine includes a main frame or supporting structure 1, a work table 2, a band saw 3, guide rollers or pulleys 4 and 5 which help to maintain a portion of the saw in a predetermined position relative to the table 2, and a drum or spool 6 which drives the saw and upon which the saw is wound and unwound as the sawing operation progresses. The spool 6 is alternatively driven in a sawing direction from a motor 7, or in a reverse direction from a motor 8, through transmission mechanism as follows.

A shaft 9 is carried by a swinging bracket 10, and has fixed thereon a relatively large pulley 11 and a relatively small pulley 12, respectively driven by belts 13 and 14 from the motors 7 and 8. Also fixed on shaft 9 is a pulley 15 which drives a pulley 16 through a belt 17, which in turn drives the drum 6 through a rod 18 fixed with the pulley.

The drum 6, in addition to being rotatable, is axially movable. It is fixed on the extended end of a screw 19 which engages a nut 20 fixed with the frame 1. As the drum is rotated the screw also is rotated, and the drum and screw together are moved axially in a direction corresponding to the direction of rotation of the drum. The screw is supported in bearings which include the nut 20 at the one end and a bushing 21 fixed with frame 1 at the other end of the screw.

At the right-hand end in Figure 2 the drum 6 is provided with axially extended portions 22 which pass between the arms 23 of pulley 16 to provide brake surfaces engageable with a brake member 24 carried by a plurality of studs such as 25, the studs being slidable to permit the brake member 24 to be moved to the left in Figure 2 by springs such as 26, the movement being limited by nuts 27 which are adjustable on the studs to determine the position of member 24.

One end of the saw 3 is removably fixed with drum 6 at the right-hand end thereof in Figure 2, as will be later explained, and the saw is wound upon the drum in a plurality of axially separated helical loops or turns such as 3a, the other end of the saw being removably fixed with the drum 6 by suitable clamp means such as the eccentric clamp 28, Figure 1, which pinches the end 3b of the saw between the eccentric portion of the clamp and the inner surface of the drum, the end of the saw being brought inside the drum through a slot 29.

One of the loops 3a of the saw is extended, as best shown in Figure 1, to pass around the pulleys 4 and 5, and around another pulley 30 which is carried by a pivoted lever member 31 and normally strongly urged to the left in Figure 1 by the means of a spring 32, acting on an arm 33, and anchored to the frame 1 at its other end.

The pulley 30 provides a lengthwise tension on the saw 3, which may be adjusted to suit saws of different width or thickness, or different work conditions by adjusting the pin 34 which engages the lower end of the spring, the frame 1 being slotted to permit movement of the pin, and the pin being carried on an adjustable bracket 35. The tension may also be further adjusted by changing the location of the pin 36, which carries the upper end of the spring 32, from the one to the other of holes such as 36a, the several holes being at different radius from the pivot point of the arm 33.

The extended loop of the saw 3 is maintained in a predetermined vertical plane relative to the frame of the machine, in part by the pulleys 4, 5, and 30, which are provided with flanges such as the flange 37, Figure 5, against which the back of the saw rides, the saw during saw movement being normally slightly urged against the flanges by a relatively small taper on the pulley, as shown at 37a, which also serves to permit the saw to lie substantially flat in spite of the sidewise projection or set of the saw teeth. At the point where the saw passes off the drum in the feed direction of drum movement, there is also provided a contact member 38 which helps to guide the saw, and at points adjacent to table 2 there are provided additional contact members consisting of hardened elements 39, 40, respectively mounted in the adjustable holders 41, 42.

The holder 41 may be vertically adjusted to bring the element 39 as close to the bottom of a work piece supported on the table 2 as may be desired. The holder 42 is provided with a considerable adjustment to accommodate various thicknesses of work pieces. Each of the holders may be locked in various positions of adjustment by suitable clamp means, not shown in detail.

The drum 6 is slightly cone-shaped, being tapered toward the left in Figure 2, as is there shown. This taper is principally for the purpose of accommodating the offset of the teeth in the saw, to permit the body of the saw to lie substantially parallel with the axis of the drum. By reason of this taper of the drum, the length of the saw which is embraced within the loop which extends around the pulleys 4, 5, and 30, is increasingly greater as the drum moves axially to the left in Figure 2. It is partly for the purpose of maintaining a substantially uniform tension while providing for variations in the length of the extended loop portion of the saw that the pulley 30 is mounted on a pivoted member. This pivot permits the pulley 30 to move from the position shown in Figure 1, which is approximately the position occupied by the pulley when the drum 6 is in the axial position for starting a sawing movement, to the position indicated by the dotted lines 30a, which is approximately the position occupied by the pulley when the drum and saw have completed their movement and the drum stands to the extreme of its left-hand movement in Figure 2, the arrangement and the length of spring 32 being such that there is very little difference in the tension on the saw in either of these positions or in any intermediate position of the pulley.

When the saw is to be threaded through an opening in a work piece, it is necessary to unclamp the end 3b of the saw for this purpose. It is then desirable that there should be no tension on the saw, and to remove the tension during such operation mechanism is provided as follows.

A stud 43 is pivotally fixed in the arm 31 and slidable through the stud is a rod 44, having fixed at the one end an adjustable abutment 45, the rod at the other end being fixed with a member 46 pivoted on a stud 47 carried by a lever 48 which is fixed on a shaft 49 that extends outside the frame 1 and has fixed therewith a hand lever 50. In the position of hand lever 50 as shown in Figures 1 and 3, the abutment 45 does not contact the stud 43 during movement of the pulley 30 through its range of movement previously described. But when the lever 50 is swung to stand approximately 180 degrees from the position shown, the abutment 45 moves to a position contacting the stud 43 and moving the pulley 30 to a position somewhat to the right of the position shown in Figure 1, thereby removing all tension from the saw band in whatever axial position the drum 6 may stand at the time, and even when the drum 6 is in the extreme right-hand axial position, in Figure 2, which would be the normal position of the drum at the starting of a sawing operation when the end of the saw would be threaded through a work piece.

When the tension on the saw is removed as just described, or if the saw should break during a cutting operation, it is very undesirable that the saw portions which are wrapped about the drum 6 should be permitted to unwind. In order to prevent this a roller or pulley member 51 is carried by a pivoted lever 52 to be pressed against the two loops of the saw on either side of the extended loop which passes around the pulleys 4, 5, and 30, the lever 52 being urged in proper direction by a spring 53.

In the event that the saw should break during a cutting operation, as sometimes occurs, the pulley 30 would be suddenly urged to the left in Figure 1 by the spring 32. To avoid breakage or damage from the contact of the pulley 30 with the frame 1, a buffer or bumper 54, of rubber or other suitable material, is provided at the point where the rim of the pulley would otherwise contact with the frame.

For angular sawing the table 2 is pivoted for movement about a plurality of transverse pivots, including a pivot substantially coinciding with the top of the table at the point where the saw 3 passes through the table in Figure 2, and a pivot substantially coinciding with the top of the table where the saw passes through the table in Figure 1. For each of these pivotal movements suitable guides are provided in the supporting structure of the table, and clamping means such as the bolt 55 passing through the slot 56 for the pivot described for Figure 2, and bolt 57 passing through the slot 58 for the pivot described for Figure 1. Since suitable guide and clamp means for such table movement are well known the guides or clamps will not be described in greater detail.

The motors 7 and 8 are respectively pivoted for movement about the pivots 59 and 60, such movements, together with the pivoted bracket 10 of the pulley shaft 9 providing means automatically maintaining the drive belts in proper tension. The motors run in opposite directions, whereby to provide the opposite direction required respectively for sawing and for reverse quick transverse movement for saw 3 and the drum 6. The control mechanism for the transmission includes a manually operable push button multiple switch 61 mounted at a point on frame 1 convenient to the operator, and which provides a push button which energizes the feed motor 7 and interrupts the reverse motor 8, another push button which energizes the motor and interrupts the feed motor, and a stop button which interrupts both motors, as identified in Figure 1.

Associated with the feed motor 7 is a rate controller 62, which is adjustable by the means of a hand lever 63 to provide one or the other of several rates of feed movement to accommodate variations in operating conditions.

In addition to the manual control devices for the driving transmission there are several automatic control devices as follows. A switch 64, Figure 2, is carried by a sleeve 65 which surrounds the extended end of screw 19, the switch being mounted in position for a switch operating roller 66, which passes through a slot in the under side of the sleeve 65, to be contacted by an element 67 rotatably mounted on the end of the screw, just before the screw reaches its extreme right-hand position.

Switch 64 is connected between the switch 61 and the reverse motor 8, and when operated as described by the member 67, interrupts the current to the reverse motor, even though the switch 61 is in reverse position. The switch 64 is mounted for adjustment on a member 68 adjustably fixed on the sleeve 65 and is adjusted to interrupt the reverse motor at a point somewhat in advance of the extreme right-hand position of the drum in Figure 2. The drum being relatively rapidly rotated during reverse movement continues to rotate until the drum portions 22 contact the brake ring 24, and is then quickly slowed down and stopped without undue shock or strain. The adjustment of the member 68, and the previously described adjustment of the brake ring 24, permits of accurate adjustment of the stopping point of the right-hand drum movement.

In the left-hand movement, Figure 1, of the drum 6, a member 69 rotatably mounted on the end of screw 19, contacts a roller 70 which operates a feed motor interrupting switch 71, connected between the switch 61 and the feed motor 7. The switch 71 is carried by a member 72 adjustably mounted in a bore 73, the adjustment being sufficient that the feed motor may be interrupted at substantially any point in the left-hand movement of drum 6, the member 72 being locked in various adjusted positions by bolts such as 74. One of the reasons for a relatively large adjustment for the position of the switch 71 is to provide for using relatively short saws as well as long saws. If, for instance, a saw should break the remaining portions may still be used for suitable sawing operations by limiting the left-hand movement to correspond with the length of saw available on the drum. The rotational and axial movement of the drum 6 during sawing being relatively slow, it is unnecessary to provide a brake in connection with switch 71 for stopping the drum in its left-hand or sawing direction of movement. The means shown is sufficient to stop the drum at an exact point, both axially and angularly, whereby the drum may always be stopped with the clamp 28 in the position for most convenient access thereto.

Another interrupting switch 75, Figures 1 and 3, is mounted on the column 1 in a position for the switch operating roller 76 to be contacted by a member 77 fixed on the lever arm 31, to open the switch in the event that the saw should break and the pulley 30 and arm 31 thereby be permitted to move to the left in Figure 1 to a point where the pulley is in contact with the bumper 54. Another member 78 fixed on the lever arm 33 contacts the switch operating roller 76 to open the switch when the pulley 30 is in the other extreme of its movement, brought about by the operation of the hand lever 50 to move the pulley 30 to the position occupied when the saw is to be threaded through a work piece as previously explained, or when a saw is to be replaced on drum 6 in the course of an operation later described. Switch 71 is placed in the line leading to both the motors 7 and 8, and it therefore results that when the pulley 30 is in either of the positions just described, that is to say, in the position occupied when the saw is broken, or in the position occupied when the tension on the extended saw loop is removed to permit threading the saw through a work piece or to effect replacement of a saw, neither of the driving motors can be started, thus preventing injury to the operator or to the machine which would result if the machine were operated under conditions then existing.

The switches and rate controller above described may take several well-known forms, depending upon the type of current and motors employed, and it is therefore considered unnecessary to further describe them. The connection of the control devices to produce the effects described is shown diagrammatically in Figure 6.

For the purpose of initially loading a saw such as saw 3 it is convenient to provide additional mechanism in the machine as follows. A stud 79 is fixed in the frame of the machine suitable for rotatably supporting a spool or drum 80 upon which a band saw is wound in layers, one on top of the other, as shown at 80a, the position of the spool 80 being such that the outer end 80b of the saw may be pulled out to pass over the pulleys 30, 4, 5, and onto the drum 6 to be clamped therewith by clamp 28. Cooperating with the spool 80 is a brake such as 81 which may be released to be spring-pressed against the periphery of the spool to provide a suitable drag or tension. At this time the drum is axially in the farthest position to the right in Figure 2. The feed motor 7 is then started and during the course of resulting rotational and axial movement of the drum to the left in Figure 2, the saw is unwound from the spool 80 and transferred to the drum. During the saw loading operation, hand lever 50 must stand in the position shown in Figures 1 and 3. The pulley 30 is then not restrained by the saw, and would, unless prevented, move back against the bumper 54 to a position which would interrupt the feed motor switch 71. It is necessary to prevent such interruption during the loading operation, which may be done by inserting a suitable spacing piece, not shown, between the abutment member 45 and stud 43 on the rod 44, or by other suitable means.

After the saw is loaded on the drum, the means blocking interruption of switch 71 is removed, and the hand lever 50 turned to the position 180 degrees from the position shown in Figure 1, which again interrupts the switch 71. The spool 80 is then removed and the extending end of the saw is clamped by a clamp 82 of suitable form, the roll 51 holding the saw from unwinding on the drum 6 during the clamping. Lever 50 is then turned back to the position effecting saw tension and the machine is then ready to proceed with a sawing operation. The loading spool 80 also provides a convenient and improved means for shipping and storing the saws in coiled form ready for loading.

It is preferable that a portion of the saw at each end thereof be made without saw teeth. This is partly in order that portions of the saw which are to be manually manipulated in order to load the saw or to thread it through a work piece for a sawing operation, will be a plain band which is preferable for manual handling. There are also other reasons for making these portions of the saw without teeth. It frequently occurs that the saw travels a considerable distance into the work piece. The saw teeth are offset, and the slot cut by the saw will be materially wider than the body of the saw. When the end of the movement in either direction has been reached, the saw may easily be manipulated into or out of the slot which it has cut if there are no teeth on that portion of the saw which then engages the work piece, but if the work piece is then engaged by a toothed portion of the saw the saw may bind, and even be broken.

In the sawing out of an internal portion of a work piece such as a die or a stripper plate, and assuming that the drum 6 has previously been returned to its right-hand axial position, as shown in Figure 2, the operation of the machine proceeds as follows. The hand lever 50 is moved to the position removing the tension on the saw. The clamp 28 is then operated to free the end 3b of the saw which is drawn backwards off the pulley 5, the saw support 40 being ordinarily then adjusted to an upward position. The loose end of the saw is then threaded through the work piece and again replaced on pulley 5 and clamped by the clamp 28. During all this operation it will be impossible to start either of the motors 7 or 8, the current being interrupted at the switch 71 as previously pointed out. The hand lever 50 is then returned to the position shown in Figures 1 and 3, and the feed button of the controller 61 is operated to start the sawing operation, the work piece being pressed against the saw and guided manually.

As the sawing operation proceeds the drum 6 travels to the left in Figure 2 until such time as the member 69 on the end of feed screw 19 contacts the switch 70 to interrupt current to the feed motor. At this time the operator withdraws the work piece sufficiently from the saw that the teeth will not rub during the return movement. The reverse button of the switch is then pressed to start the reverse movement at rapid rate, and when the reverse movement of the drum is completed, the contact member 67 on the right-hand end of the screw operates the switch 64 to interrupt the motor 8 just before the drum position shown in Figure 2 is reached. Almost immediately thereafter the brake elements 22 and 24 contact one another, the element 24 yielding sufficiently to avoid shocks, but bringing the drum quickly to a stop in the position for starting a new sawing cut. Such forward and reverse movements are repeated until the sawing operation is completed.

What is claimed is:

1. In a sawing machine, the combination of a base, a work support, rotary spool means, a flexible bandsaw having open ends and having a major portion wound on said spool means and another portion guided for straight line movement in a space adjacent said work support, transmission means for progressive movement of said major saw portion through said space in a sawing direction at a sawing rate, and transmission means for thereafter moving said major saw portion through said space in the other direction at a relatively rapid rate.

2. In a sawing machine, the combination of a base, a work support, rotary spool means, a flexible bandsaw having open ends and having a major portion wound on said spool means and another portion guided for straight line movement in a space adjacent said work support, transmission means for progressive movement of said major saw portion through said space in a sawing direction at a sawing rate, and for thereafter moving said major saw portion through said space in the other direction, a device operable to establish an endwise tension on the portion of said saw within said space, means for adjusting said tension device to relieve said tension, and automatic means for interrupting said transmission whenever said device is inoperative to effect said tension.

3. In a sawing machine, the combination of a base, a work support, rotary spool means, a flexible bandsaw having open ends and having a major portion wound on said spool means and another portion guided for straight line movement in a space adjacent said work support, transmission means for progressive movement of said major saw portion through said space in a sawing direction at a sawing rate, and for thereafter moving said major saw portion through said space in the other direction, and automatic means for interrupting said transmission and operative in accordance with the completion of movement of said major saw portion in said other direction.

4. In a sawing machine, the combination of a base, a work support, rotary spool means, a flexible bandsaw having open ends and having a major portion wound on said spool means and another portion guided for straight line movement in a space adjacent said work support, transmission means for progressive movement of said major saw portion through said space in a sawing direction at a sawing rate, and for thereafter moving said major saw portion through said space in the other direction, manual control means for said transmission including means alternatively operable for interrupting or starting said transmission at any point in said saw movements and automatic control means for interrupting said transmission and actuated in accordance with the completion of the movement of said saw in both said directions.

5. In a sawing machine, the combination of a base, a work support, rotary spool means, a flexible bandsaw having open ends and having a major portion wound on said spool means and another portion guided for straight line movement in a space adjacent said work support, transmission means for progressive movement of said major saw portion through said space in a sawing direction at a sawing rate, and for thereafter moving said major saw portion through said space in the other direction, a member normally urged against said saw and toward another position upon breaking of said saw, and means automatically operative upon movement of said member to said other position for interruption of said transmission.

6. In a sawing machine, the combination of a base, a work support, rotary spool means, a flexible bandsaw having open ends and having a major portion wound on said spool means and another portion guided for straight line movement in a space adjacent said work support, transmission means for progressive movement of said major saw portion through said space in a sawing direction at a sawing rate, and for thereafter moving said major saw portion through said space in the other direction, and means for interrupting said transmission when said saw has completed movement in one of said directions, a portion of said saw occupying said space following said interruption being formed to avoid teeth extending laterally of the body strip of the saw.

7. In a sawing machine, the combination of a base, a work support, rotary spool means, a flexible bandsaw having open ends and having a major portion wound on said spool means and another portion guided for straight line movement in a space adjacent said work support, transmission means for progressive movement of said major saw portion through said space in a sawing direction at a sawing rate, and for thereafter moving said major saw portion through said space in the other direction, and control means for said transmission including rate change means effective to predetermine the rate of saw movement in said sawing direction, means for reversing said transmission including a plurality of power operable trip devices respectively operable in accordance with saw movement in opposite directions.

8. In a sawing machine, the combination of a base, a work support, rotary spool means, a flexible bandsaw having open ends and having a major portion wound on said spool means and another portion guided for straight line movement in a space adjacent said work support, transmission means for progressive movement of said major saw portion through said space in a sawing direction at a sawing rate, and for thereafter moving said major saw portion through said space in the other direction, and control means for said transmission including rate change means effective to predetermine the rate of saw movement in said sawing direction, said rate change means being ineffective to alter the rate of saw movement in said other direction.

9. In a sawing machine, the combination of a work support, a rotatable spool adapted to receive the major portion of an open end bandsaw wound thereon in a series of substantially concentric coils, guide means adapted to restrain another portion of said saw in a straight line form in a space adjacent said work support, a bandsaw having open ends, and means for winding said bandsaw on said spool including another rotatable spool adapted to receive said saw in substantially concentric coils, a bearing for the last mentioned spool, means associated with the first mentioned spool for clamping one end of a saw mounted on said last mentioned spool, and means for rotation of the first mentioned spool to transfer the saw from the one spool to the other.

10. In a sawing machine, the combination of a work support, a rotatably and axially movable spool adapted to receive the major portion of an open end bandsaw wound thereon in spaced helical coils, a bandsaw having open ends, and means for winding said bandsaw on said spool including a second rotatable spool, said second spool being adapted to receive said saw in substantially concentric coils, clamp means associated with the first mentioned spool for clamping an end of said saw thereto, a bearing for supporting said second spool in position for an end of a saw mounted thereon to be received by said clamp, and means for the rotation and simultaneous axial movement of said first mentioned spool to transfer the saw from the one spool to the other.

11. In a sawing machine, the combination of a base, a work support, rotary spool means, a flexible bandsaw having open ends and having a major portion wound on said spool means and another portion guided for straight line movement in a space adjacent said work support, transmission means for progressive movement of said major saw portion through said space in a sawing direction at a sawing rate, and for thereafter moving said major saw portion through said space in the other direction at relatively rapid rate, automatic means for interrupting said transmission just prior to the completion of saw movement in said other direction and automatic brake means operative to stop saw movement immediately following the operation of said interrupting means.

12. In a sawing machine, the combination of a base, a work support, rotary spool means, a flexible bandsaw having open ends and having a major portion wound on said spool means and another portion guided for straight line movement in a space adjacent said work support, transmission means for progressive movement of said major saw portion through said space in a sawing direction at a sawing rate, and for moving said major saw portion through said space in the other direction, trip means operative in accordance with saw movement for interruption of said transmission at the end of saw movement in each direction, and manually operable means immediately operable after either interruption to render said transmission operative for saw movement in the opposite direction.

13. In a sawing machine, the combination of a base, a work support, rotary spool means, a flexible bandsaw having open ends and having a major portion wound on said spool means and another portion guided for straight line movement in a space adjacent said work support, transmission means for progressive movement of said major saw portion through said space in a sawing direction at a sawing rate, and for moving said major saw portion through said space in the other direction, automatic reverse means for interruption of said transmission at the end of saw movement in each direction, one of said interrupting means being adjustable to change the point of interruption of saw movement in the sawing direction, and manually operable means immediately operable after either interruption to render said transmisison operative for saw movement in opposite direction.

14. In a sawing machine, the combination of a base, a work support, rotary spool means, a flexible bandsaw having open ends and having a major portion wound on said spool means and another portion guided for straight line movement in a space adjacent said work support, transmission means for progressive movement of said major saw portion through said space in a sawing direction at a sawing rate, and transmission means for thereafter moving said major saw portion through said space in the other direction at a relatively rapid rate, said transmission means including a plurality of motors simultaneously mechanically connected with said saw and respectively for the different directions of saw movement, and control means for said transmission including switch devices respectively for the different motors and interconnected for selectively energizing said motors one at a time.

15. In a sawing machine, the combination of a base, a work support, a laterally flexible bandsaw, and a rotary and axially movable spool carried by said base, a major portion of said saw being helically disposed on the periphery of said spool and a loop portion between two adjacent helix portions being extended to pass through a straight line path adjacent said work support, and transmission mechanism for progressive simultaneous rotation and axial of said spool in a forward sawing direction at a sawing rate and thereafter in the reverse direction at a relatively rapid rate.

16. In a sawing machine, the combination of a base, a work support, rotary spool means, a flexible bandsaw having open ends and having a major portion wound on said spool means and another portion guided for straight line movement in a space adjacent said work support, transmission means for progressive movement of said major saw portion through said space in a sawing direction at a sawing rate, transmission means for moving said major portion of said saw through said space in a forward sawing direction, a tension device for establishing an endwise tension on said saw sufficient to maintain said portions in substantially predetermined position on said spool, and roller means adapted to maintain said predetermined position upon failure of said tension device.

17. In a sawing machine, the combination of a base, a work support, a laterally flexible bandsaw, and a rotary and axially movable spool carried by said base, a major portion of said saw being helically disposed on the periphery of said spool and a loop portion between two adjacent helix portions being extended to pass through a straight line path adjacent said work support, transmission mechanism for progressive simultaneous rotation and axial movement of said spool in a forward direction at a sawing rate and thereafter in a reverse direction, and automatic means operative in accordance with the movement of said saw interrupting said transmission at a predetermined point the movement in said reverse direction.

18. In a sawing machine, the combination of a base, a work support, a laterally flexible bandsaw, and a rotary and axially movable spool carried by said base, a major portion of said saw being helically disposed on the periphery of said spool and a loop portion between two adjacent helix portions being extended to pass through a straight line path adjacent said work support, transmission mechanism for progressive simultaneous rotation and axial movement of said spool in a forward direction at a sawing rate and thereafter in a reverse direction, automatic trip means for interrupting said transmission at a predetermined point in the movement in said reverse direction, and manual means for selectively interrupting or rendering said transmission effective at any point in the movement in either direction.

19. In a sawing machine, the combination of a base, a work support, a laterally flexible bandsaw, and a rotary and axially movable spool carried by said base, a major portion of said saw being helically disposed on the periphery of said spool and a loop portion between two adjacent helix portions being extended to pass through a straight line path adjacent said work support, transmission mechanism for progressive simultaneous rotation and axial movement of said spool in a forward direction at a sawing rate and thereafter in a reverse direction, power actuated trip means for interrupting said transmission at a predetermined point in the movement in either direction, said means being operative to prevent transmission operation for farther movement in the same direction, and manual means operable immediately following interruption to render said transmission operative for movement in the other direction.

BENJAMIN GROB.